United States Patent
Kuninobu et al.

(10) Patent No.: US 12,039,486 B2
(45) Date of Patent: Jul. 16, 2024

(54) INFORMATION PROCESSING APPARATUS, INFORMATION PROCESSING METHOD, AND NON-TRANSITORY COMPUTER READABLE MEDIUM

(71) Applicant: KABUSHIKI KAISHA TOSHIBA, Tokyo (JP)

(72) Inventors: Shigeta Kuninobu, Yokohama Kanagawa (JP); Keiichi Handa, Ota Tokyo (JP); Takufumi Yoshida, Funabashi Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 17/470,903

(22) Filed: Sep. 9, 2021

(65) Prior Publication Data

US 2022/0261756 A1   Aug. 18, 2022

(30) Foreign Application Priority Data

Feb. 17, 2021   (JP) ................. 2021-023281

(51) Int. Cl.
*G06Q 10/0835* (2023.01)
*G06Q 10/0631* (2023.01)
*G06Q 10/087* (2023.01)
*G06Q 30/0283* (2023.01)

(52) U.S. Cl.
CPC . *G06Q 10/08355* (2013.01); *G06Q 10/06311* (2013.01); *G06Q 10/087* (2013.01); *G06Q 30/0283* (2013.01)

(58) Field of Classification Search
CPC ....... G06Q 10/08355; G06Q 10/06311; G06Q 10/087; G06Q 30/0283

USPC .......................................... 705/338
See application file for complete search history.

(56) References Cited

U.S. PATENT DOCUMENTS

| | | | |
|---|---|---|---|
| 2013/0275253 A1 | 10/2013 | Mesaros | |
| 2018/0349849 A1* | 12/2018 | Jones | G06Q 10/08345 |
| 2019/0378064 A1* | 12/2019 | Kawasaki | G06Q 10/0631 |
| 2021/0090168 A1* | 3/2021 | Mohsen | G06Q 30/08 |

FOREIGN PATENT DOCUMENTS

| | | | |
|---|---|---|---|
| JP | 5339230 B2 | 11/2013 | |
| WO | WO 2021/001980 A1 | 1/2021 | |

OTHER PUBLICATIONS

"Day Trading profit maximization with multi-task learning and technical analysis" Published by Springer Link (Year: 2015).*

(Continued)

*Primary Examiner* — Zeina Elchanti
(74) *Attorney, Agent, or Firm* — Finnegan, Henderson, Farabow, Garrett & Dunner, LLP

(57) ABSTRACT

According to one embodiment, an information processing apparatus includes processing circuitry. The processing circuitry is configured to combine a sell condition under which a first dealer sells a product and a buy condition under which a second dealer buys the product on a basis of information of a first transport medium to transport the product, and generate matching information including the sell condition and the buy condition combined each other; and assign a transport of the product to the first transport medium by associating the transport with the first transport medium and perform scheduling of the transport on a basis of the matching information.

19 Claims, 17 Drawing Sheets

(56) References Cited

OTHER PUBLICATIONS

Japan Patent Office, Decision to Grant a Patent in JP Application No. 2021-023281, 1 page and machine translation, 2 pages (May 10, 2024).

* cited by examiner

PRODUCER LIST (SELL CONDITIONS)

| SELL ID | SELL QUANTITY [kg] | UNIT PRICE [yen/kg] | SELL AVAILABILITY PERIOD | SWEETNESS [deg.] | SELL LOCATION |
|---|---|---|---|---|---|
| P1 | 110~120 | 400 | 10/1~10/5 | 10~13 | MARKET A |
| P2 | 150~160 | 410 | 10/2~10/4 | 13~14 | MARKET B |
| P3 | 100~150 | 380 | 10/3~10/7 | 10~11 | MARKET C |

FIG. 2

BUYER LIST (BUY CONDITIONS)

| BUY ID | BUY QUANTITY [kg] | UNIT PRICE [yen/kg] | BUY AVAILABILITY PERIOD | SWEETNESS [deg.] | BUY LOCATION | AUXILIARY CONDITION ID |
|---|---|---|---|---|---|---|
| S1 | 150~160 | 950 | 10/1~10/5 | 10~12 | MARKET D | 1 |
| S1 | 150~160 | 990 | 10/1~10/5 | 12~14 | MARKET D | 2 |
| S2 | 100~180 | 920 | 10/3~10/7 | 10~11 | MARKET E | — |
| S3 | 90~98 | 1050 | 10/6~10/10 | 12~13 | MARKET F | — |

FIG. 3

TRANSPORT MEDIUM LIST

| TRUCK ID | LOAD CAPACITY [kg] | SPEED [km/h] | COST [yen/day] | WASTE RATE [%/day] |
|---|---|---|---|---|
| T1 | 90~110 | 50 | 4000 | 1 |
| T2 | 120~160 | 40 | 6000 | 0.5 |

FIG. 4

SPECIFIC TRANSACTION PRICE LIST

| SELL ID | SELL AUXILIARY CONDITION ID | BUY ID | BUY AUXILIARY CONDITION ID | SELL UNIT PRICE [yen/kg] | BUY UNIT PRICE [yen/kg] |
|---|---|---|---|---|---|
| P1 | - | S2 | - | 395 | 925 |
| P2 | - | S1 | 2 | 405 | 1000 |

FIG. 5

INFORMATION PROCESSING APPARATUS, INFORMATION PROCESSING METHOD, AND NON-TRANSITORY COMPUTER READABLE MEDIUM

CROSS REFERENCE TO RELATED APPLICATIONS

This application is based upon and claims the benefit of priority from the prior Japanese Patent Application No. 2021-023281, filed on Feb. 17, 2021, the entire contents of which are incorporated herein by reference.

FIELD

Embodiments described herein relate to an information processing apparatus, an information processing method, and a non-transitory computer readable medium.

BACKGROUND

A method of generating a delivery plan for delivering products such as goods by a transport medium (such as a truck or ship) according to a transport request (a request to load or unload goods at port (harbor), for example) is known. However, in the case of a business that buys products from a producer and transports and markets the products to a buyer, a method of generating a delivery plan that maximizes the profit from the business is not known.

BRIEF DESCRIPTION OF THE DRAWINGS

FIG. 2 is a diagram illustrating an example of a producer list;

FIG. 3 is a diagram illustrating an example of a buyer list;

FIG. 4 is a diagram illustrating an example of a transport medium list;

FIG. 5 is a diagram illustrating an example of a specific transaction price list;

DETAILED DESCRIPTION

According to one embodiment, an information processing apparatus includes processing circuitry. The processing circuitry is configured to combine a sell condition under which a first dealer sells a product and a buy condition under which a second dealer buys the product on a basis of information of a first transport medium to transport the product, and generate matching information including the sell condition and the buy condition combined each other; and assign a transport of the product to the first transport medium by associating the transport with the first transport medium and perform scheduling of the transport, on a basis of the matching information.

In a business that buys a product from a first dealer (such as a seller) and transport and sell the bought product to a second dealer (such as a buyer), the present embodiment maximizes or optimizes the profit obtained by a third dealer acting as an agent of the business. The first dealer that sells the product to the third dealer of the business is assumed to be the producer of the product, but the first dealer is not necessarily the producer, and may also be a reseller that resells the product purchased from another dealer to the third dealer of the business, for example. The second dealer may be a retailer who markets the product bought from the third dealer of the business to consumers or the like, or consumers who consume the product themselves. The product may be any transportable merchandise, such as food, goods, or animals and plants. The transport medium that transports the product may be any medium capable of transporting a product on land, in the air, on water, underwater, or the like, such as a truck, a ship, an airplane, a drone, a train, an automobile, or a robot. The transport medium to be used may be determined according to the type or quantity of the product to be transported. As an example, the present embodiment illustrates the case where the first dealer is an apple grower, the product is apples, and the transport medium is a truck.

Hereinafter, the embodiment will be described in detail and with reference to the drawings.

Figure 1:
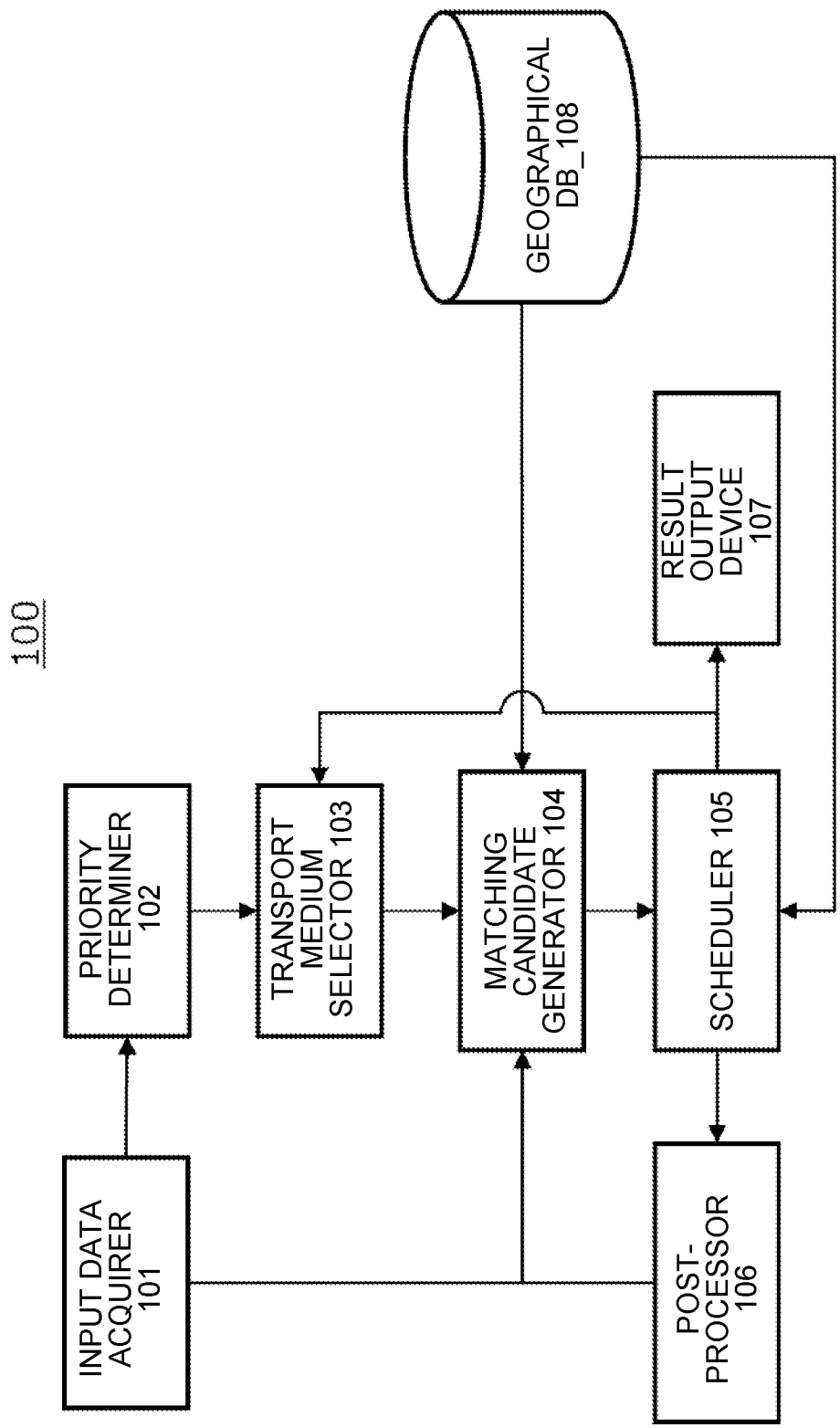
FIG. 1 is a block diagram of a transport plan apparatus as an information processing apparatus according to the embodiment.

FIG. 1 is a block diagram of a transport plan apparatus 100 as an information processing apparatus according to the embodiment. The transport plan apparatus 100 is provided with an input data acquirer 101, a priority determiner 102, a transport medium selector 103, a matching candidate generator 104, a scheduler 105, a post-processor 106, a result output device 107, and a geographical database (DB) 108. The elements 101 to 108 can be configured by circuitry as such a CPU, an ASIC, or a MPU. For example, part or all of the elements 101 to 108 can be configured by processing circuitry. The element 108 can be configured by a hardware storage device such as a memory device, a hard disk device, or an optical disc device.

The input data acquirer 101 acquires data (input data) required in operations performed by the embodiment from internal storage or an external device. The input data includes a producer list (first list), a buyer list (second list), a transport medium list, and a specific transaction price list. Otherwise, the input data may also include parameters required by the operation (for example, the execution of a function) in each block of the transport plan apparatus 100. The internal storage from which the input data is acquired may be a recording medium of any type, such as a memory device, a hard disk device, or an optical disc device. The external device may be a storage server on a communication network, or a device connected to the transport plan apparatus 100 by a cable. Alternatively, the input data acquirer 101 may acquire data that has been inputted by an operator (i.e., a user) of the transport plan apparatus 100 using an input device such as a keyboard or mouse.

The producer list includes sell conditions, which are the conditions under which a producer (first dealer) sells the product, for each producer. Specifically, the producer list includes the producer, the product sell location (a place specified by the producer), a period during which the product can be sold (sell availability period), at least one of the quality and the quantity of the product, and the product sell price. Note that selling the product is also referred to as marketing the product.

FIG. 2 illustrates an example of a producer list. The producer list contains three entries. A sell ID ("P1", "P2", "P3") is an identifier for each producer. The producer "P1" is able to market 100-120 kg of apples having a sweetness from 10 to 13 degrees Brix at a unit price of 400 [yen/kg] at Market A between October 1 and October 5.

The producer "P2" is able to market 150-160 kg of apples having a sweetness from 13 to 14 degrees Brix at a unit price of 410 [yen/kg] at Market B between October 2 and October 4.

The producer "P3" is able to market 100-150 kg of apples having a sweetness from 10 to 11 degrees Brix at a unit price of 380 [yen/kg] at Market C between October 3 and October 7.

The sweetness corresponds to the quality of the product. The quantity for sale corresponds to the quantity of the product. The unit price corresponds to the sell price of the product.

In the present embodiment, the time granularity is set to days. However, the time granularity may also be in other units, such as 10 minutes, 1 hour, or 1 week.

The buyer list contains conditions under which the buyer (second dealer) buys the product (buy conditions). Specifically, the buyer list includes the buyer, the product buy location (a place specified by the buyer), a period during which the product can be bought, at least one of the quality and the quantity of the product, and the product buy price. Note that buying the product is also referred to as purchasing the product.

FIG. 3 illustrates an example of a buyer list. The buyer list contains three entries. A buy ID ("S1", "S2", "S3") is an identifier for each buyer.

The buyer "S1" is thinking of purchasing 150-160 kg of apples at Market D between October 1 and October 5, but has set two prices according to the sweetness. The buyer "S1" will buy at 950 [yen/kg] if the sweetness is from 10 to 12 degrees Brix, and will buy at 990 [yen/kg] if the sweetness is from 12 to 14 degrees Brix. However, the buyer "S1" will only buy the product under one of the conditions. In other words, the buyer "S1" has set a plurality (in this example, two) of selectable buy conditions. A condition that changes the price setting depending on the conditions of the product in this way is referred to as an auxiliary condition, and assigning an auxiliary condition is referred to as setting an auxiliary condition. The buy ID to which an auxiliary condition is assigned is also assigned an auxiliary condition ID for distinguishing the auxiliary conditions. Auxiliary conditions may also be set in the producer list in addition to, or instead of the buyer list. That is, a producer is able to set a plurality of selectable sell conditions. For example, a producer is able to set two sell conditions, one without an auxiliary condition and one with an auxiliary condition.

The buyer "S2" is able to buy 100-180 kg of apples having a sweetness from 10 to 11 degrees Brix at a unit price of 920 [yen/kg] at Market E between October 3 and October 7.

The buyer "S3" is able to buy 90-98 kg of apples having a sweetness from 12 to 13 degrees Brix at a unit price of 1050 [yen/kg] at Market F between October 6 and October 10.

The transport medium list contains one or more transport conditions under which the transport medium transports the product as information related to the transport medium. As an example, the transport condition includes at least one of a load capacity, a travel speed (average speed), a product transport cost, and a product waste rate. Other items, such as fuel consumption for example, may also be included in the transport conditions. Items such as the load capacity, the travel speed, and the fuel consumption are examples of the performance of the transport medium.

FIG. 4 is a diagram illustrating an example of the transport medium list. The transport medium list contains two entries. Specifically, the transport medium list includes information related to two trucks for transporting apples. A truck ID ("T1", "T2") is an identifier for each truck.

The truck "T1" can carry 90-110 kg (load) of apples, and travel at an average speed of 50 km/h. An expense (transport cost) of 4000 yen per day is incurred.

The truck "T2" can carry 120-160 kg of apples, and travel at an average speed of 40 km/h. An expense of 6000 yen per day is incurred.

The waste rate indicates how many apples are bruised during transport and are no longer suitable for sale. For example, a waste rate of 1 [%/day] indicates that 1% of the apples become unsuitable for sale per day. As a specific example, in the case of a waste rate of 1 [%/day], if 100 kg of apples are transported over three days, 100 kg×0.01×3=3 kg of the apples will be unsuitable for sale. In other words, the buyer is able to acquire 97 kg of apples. The 3 kg of apples being unsuitable for sale means that the sales (i.e., a sales amount) by the business will be reduced by an amount of money corresponding to 3 kg of apples.

The apples transported by a single truck in a single run are assumed to be only the apples transported from the sell location of a producer with one sell ID to the buy location of a buyer with one buy ID. In other words, it is assumed that the apples from producers with a plurality of sell IDs are not loaded together onto a single truck at the same time, and that the apples intended for buyers with a plurality of buy IDs are not loaded together onto a single truck at the same time.

The specific transaction price list includes a specific transaction price to be applied only between a specific producer and a specific buyer. The specific transaction price includes at least one of a specific sell price and a specific buy price. The sell price to be applied between a specific producer and a specific buyer corresponds to one example of the sell condition under which a producer sells the product. The buy price to be applied between a specific producer and a specific buyer corresponds to one example of the buy condition under which a buyer buys the product. In the case where a plurality of selectable sell conditions are set with respect to a producer, one of the plurality of sell conditions may include a specific transaction price (specific sell price). In the case where a plurality of selectable buy conditions are set with respect to a buyer, one of the plurality of buy conditions may include a specific transaction price (specific buy price).

FIG. 5 illustrates an example of the specific transaction price list. The specific transaction price list contains two entries. Each entry includes the setting of a specific transaction price (a specific sell unit price and a specific buy unit price) to be applied only in the case of a transaction between a specific producer and buyer.

In the case of a transaction between the producer "P1" and the buyer "S2", the sell unit price is 395 [yen/kg] and the buy unit price is 925 [yen/kg]. In other words, a business could buy apples from the producer "P1" at 395 [yen/kg], and market the apples to the buyer "S2" at 925 [yen/kg].

Also, in the case of adopting the buyer's auxiliary condition (ID: 2) in a transaction between the producer "P2" and the buyer "S1", the sell unit price is 405 [yen/kg] and the buy unit price is 1000 [yen/kg]. In other words, a business could buy apples from the producer "P2" at 405 [yen/kg], and market the apples to the buyer "S1" at 1000 [yen/kg].

In the present embodiment, when the producer list, the buyer list, the transport medium list, and the specific transaction price list are given as inputs, the sell conditions of the producers are combined with the buy conditions of the buyers who match the sell conditions to generate matching information (hereinafter referred to as matching candidates). In the case where a buy condition matching a sell condition does not exist, the generated matching information may be 0 in some cases. Some or all of the matching candidates are assigned to a transport medium by associating the matching candidates with the transport medium to generate a transport schedule for the transport medium. The present embodiment generates the matching candidates and the transport schedule to maximize or optimize profit for the owner of the business. Here, the profit from the business is calculated by subtracting costs such as the cost of purchasing apples from the producer, the waste cost corresponding to the waste rate, the transport expenses of the truck, and the like from the sales of apples (i.e., a sales amount of apples) to the buyer. However, the profit may also be defined in other ways. For example, the profit may also be calculated by additionally subtracting the labor costs of an operator who operates the transport medium from the sales of apples (i.e., a sales amount of apples) to the buyer.

The priority determiner 102 determines priorities of transport mediums on the basis of the transport medium list. In other words, the priority determiner 102 determines which transport medium to prioritize for use. Any selection criterion may be used as the method of determining priority, such as in order of lowest cost, highest load capacity, or lowest waste rate. In the present embodiment, the order of lowest cost is used. In the example of FIG. 4, the cost of the truck "T1" is lower than the cost of the truck "T2", and therefore the truck "T1" is prioritized over the truck "T2".

The transport medium selector 103 selects a transport medium from among the transport mediums included in the transport medium list according to the priorities determined by the priority determiner 102. Let "k" be the selected transport medium. In the above example, the truck "T1" has higher priority than the truck "T2", and therefore the truck "T1" is selected first.

The geographical database (DB) 108 is storage that stores map information about the environment through which each transport medium included in the transport medium list moves. The map information is used by the matching candidate generator 104 and the scheduler 105. The map information can be used to calculate the distance between any two geographical points and the travel time between any two geographical points, for example. The geographical DB_108 may be disposed as a server on a communication network external to the transport plan apparatus 100. In this case, the transport plan apparatus 100 receives map information from the server through the communication network. The geographical DB_108 may be configured as a recording medium of any type, such as a memory device, a hard disk device, or an optical disc device.

On the basis of the information about the transport medium "k" selected by the transport medium selector 103, the matching candidate generator 104 generates combinations of one sell condition of a producer and one buy condition of a buyer as matching candidates (pairs).

The matching candidate generator 104 corresponds to one example of a generator that generates a matching candidate including a sell condition under which a producer sells the product and a buy condition under which a buyer buys the product for which the sell condition is matched, on the basis of information about a transport medium (first transport medium) that transports the product from the producer to the buyer.

Hereinafter, operations by the matching candidate generator 104 will be described in detail. The operations by the matching candidate generator 104 execute the following two processes (Process 1 and Process 2).

Process 1

The matching candidate generator 104 calculates the maximum number of matching candidates. The maximum number of matching candidates can be calculated by generating a maximum matching calculation graph described later (see FIG. 6) and solving a maximum flow problem. Details will be described later.

Process 2

From the maximum number of matching candidates calculated in Process 1, the matching candidate generator 104 calculates a set of matching candidates for which the total sum of the profit of the matchings is a maximum. The matching candidate generator 104 can calculate the set of matching candidates by generating a profit maximization matching graph and solving a minimum-cost flow problem. Details will be described later.

Hereinafter, Process 1 will be described in detail.

Figure 6:
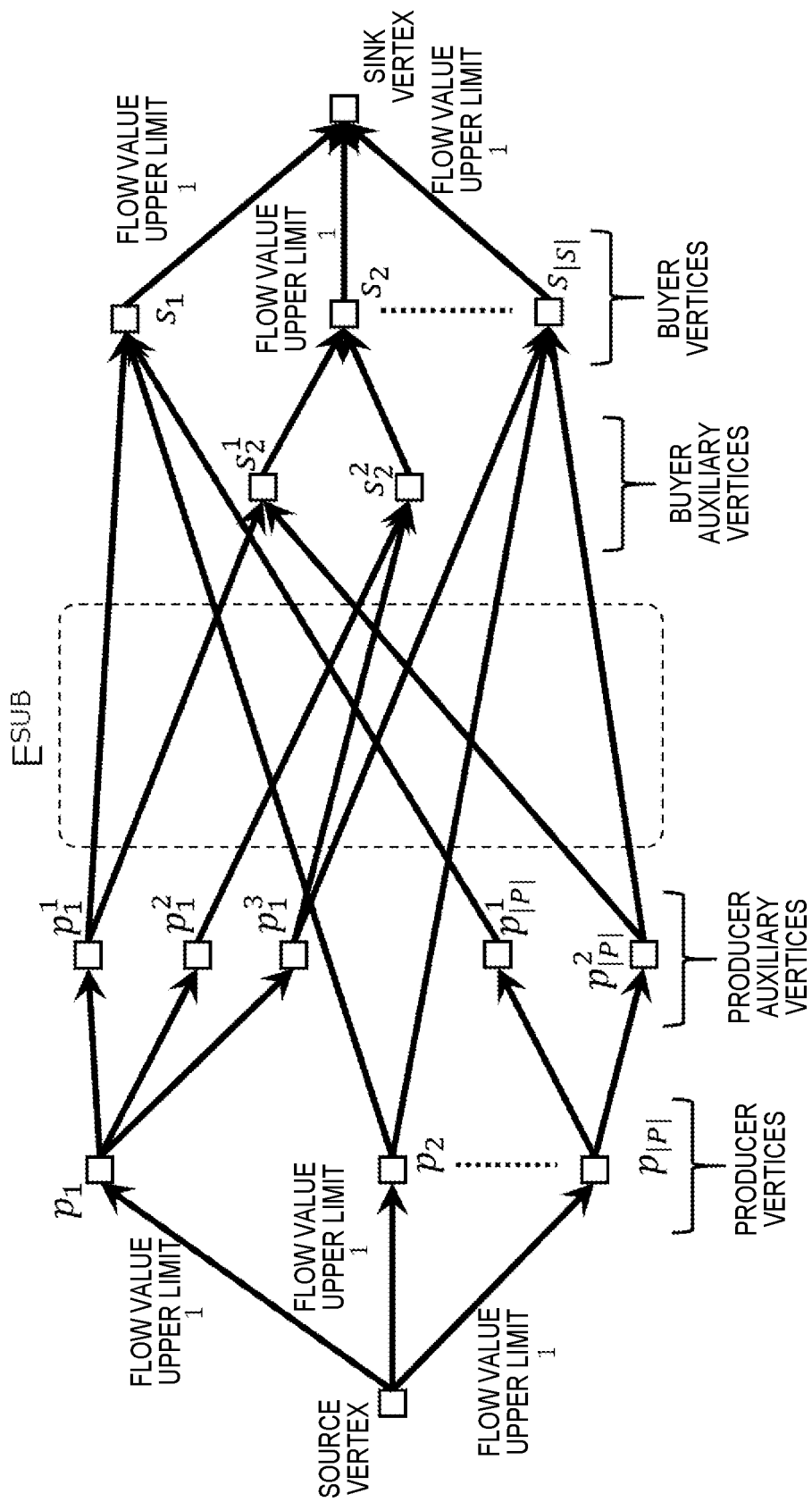
FIG. 6 is a generalization of a maximum matching calculation graph.

FIG. 6 illustrates an example of a maximum matching calculation graph. FIG. 6 is a generalization of a maximum matching calculation graph, and does not reflect the lists illustrated in FIGS. 2 to 5. The maximum matching calculation graph is a directed graph with unweighted edges. The maximum matching calculation graph is expressed by "$G^M$ (V, E)". A vertex set "V" is defined as follows.

V={source vertex, sink vertex} ∪ producer vertex set
∪ buyer vertex set ∪ producer auxiliary vertex
set ∪ buyer auxiliary vertex set The source vertex and the sink vertex are vertices corresponding to the entrance and exit.

The producer vertex set is the set ($p_1, p_2, \ldots, p_{|p|}$) of vertices generated for each producer ID.

The buyer vertex set is the set ($s_1, s_2, \ldots, s_{|s|}$) of vertices generated for each buyer ID.

The producer auxiliary vertex set ($p^1_1, p^2_1, p^3_1, p^1_{|p|}, p^2_{|p|}$) is the set of vertices generated for each auxiliary condition corresponding to a producer ID. The superscript of "p" corresponds to the auxiliary condition ID, and the subscript of "p" corresponds to the producer ID.

The buyer auxiliary vertex set ($s^1_2, s^2_2$) is the set of vertices generated for each auxiliary condition corresponding to a buyer ID. The superscript of "s" corresponds to the auxiliary condition ID, and the subscript of "s" corresponds to the buyer ID.

In the case where an auxiliary condition corresponding to a producer ID does not exist, a producer auxiliary vertex set is not generated. In the case where an auxiliary condition corresponding to a buyer ID does not exist, a buyer auxiliary vertex set is not generated. In the example of the producer list in FIG. 2, an auxiliary condition does not exist, and therefore a producer auxiliary vertex set is not generated, but in the example of the buyer list in FIG. 3, an auxiliary condition exists, and therefore a buyer auxiliary vertex set is generated.

An edge set "E" is defined as follows.

E={set of edges from source vertex to producer vertex} ∪ {set of edges from buyer vertex to sink vertex} ∪ {set of edges from producer vertex to corresponding producer auxiliary vertex} ∪ {set of edges from buyer auxiliary vertex to corresponding buyer vertex} ∪ {set of edges from producer auxiliary vertex to buyer auxiliary vertex with matching conditions}

However, in the case where auxiliary vertices (producer auxiliary vertex or buyer auxiliary vertex) do not exist, the producer vertex or buyer vertex is used. For example, in the case where a producer auxiliary vertex does not exist, edges from the producer vertex to the buyer auxiliary vertex or the buyer vertex are set. Also, in the case where a buyer auxiliary vertex does not exist, edges from the producer vertex or the producer auxiliary vertex to the buyer vertex are set.

For the sell condition of a producer and the buy condition of a buyer to have matching conditions (also referred to as "matching conditions being established"), all of the following [1] to [4] need to hold true.

[1] The day obtained by adding the transport time by the transport medium to the sell day (inside the sell availability period specified by the producer) is included in a buy availability period specified by the buyer. However, the above assumes that the transport medium travels at the speed indicated on the transport medium list while in the loaded state (loaded transport), and that deliberately driving the transport medium slowly to gain time is not allowed.

[2] The value obtained by subtracting the amount of waste according to the waste rate of the transport medium from the quantity for sale by the producer (inside a range specified by the producer) is inside the range of a quantity to buy specified by the buyer.

[3] An overlap exists between the range of sweetness specified by the producer and the range of sweetness specified by the buyer.

[4] The quantity for sale by the producer is not more than the load capacity of the transport medium "k".

Hereinafter, the set of edges between a producer auxiliary vertex and a buyer auxiliary vertex for which matching conditions are established is denoted "$E^{SUB}$". However, in the case where a producer auxiliary vertex does not exist, edges between the producer vertex and the buyer auxiliary vertex or the buyer vertex are included in "$E^{SUB}$". In the case where a buyer auxiliary vertex does not exist, edges between the producer vertex or the producer auxiliary vertex and the buyer vertex are included in $E^{SUB}$.

In the generated graph, a flow value upper limit of 1 is set with respect to all edges from the source vertex to each producer vertex as well as all edges from each buyer vertex to the sink vertex (see FIG. 6), and the maximum flow problem from the source vertex to the sink vertex is solved. In other words, the maximum value of the quantity that can be sent at one time from a source vertex through the other vertices to the sink vertex is calculated. At this point, the flow value upper limit of 1 imposed on the edges described above acts as a constraint condition. As a result of solving the above problem, a maximum flow value (the maximum value of the flow value inputtable at one time from the source vertex) is obtained. The maximum flow value expresses the maximum number of matchings achievable between the sell conditions and the buy conditions, or in other words, the maximum number of matching candidates (hereinafter denoted "|M|"). Details about the algorithm of the maximum flow problem are described further in Non-Patent Literature 1, for example.

The matching candidate generator 104 sets edge weights on the generated maximum matching calculation graph, and generates a profit maximization matching graph. The profit maximization matching graph is an edge-weighted directed graph.

Figure 7:
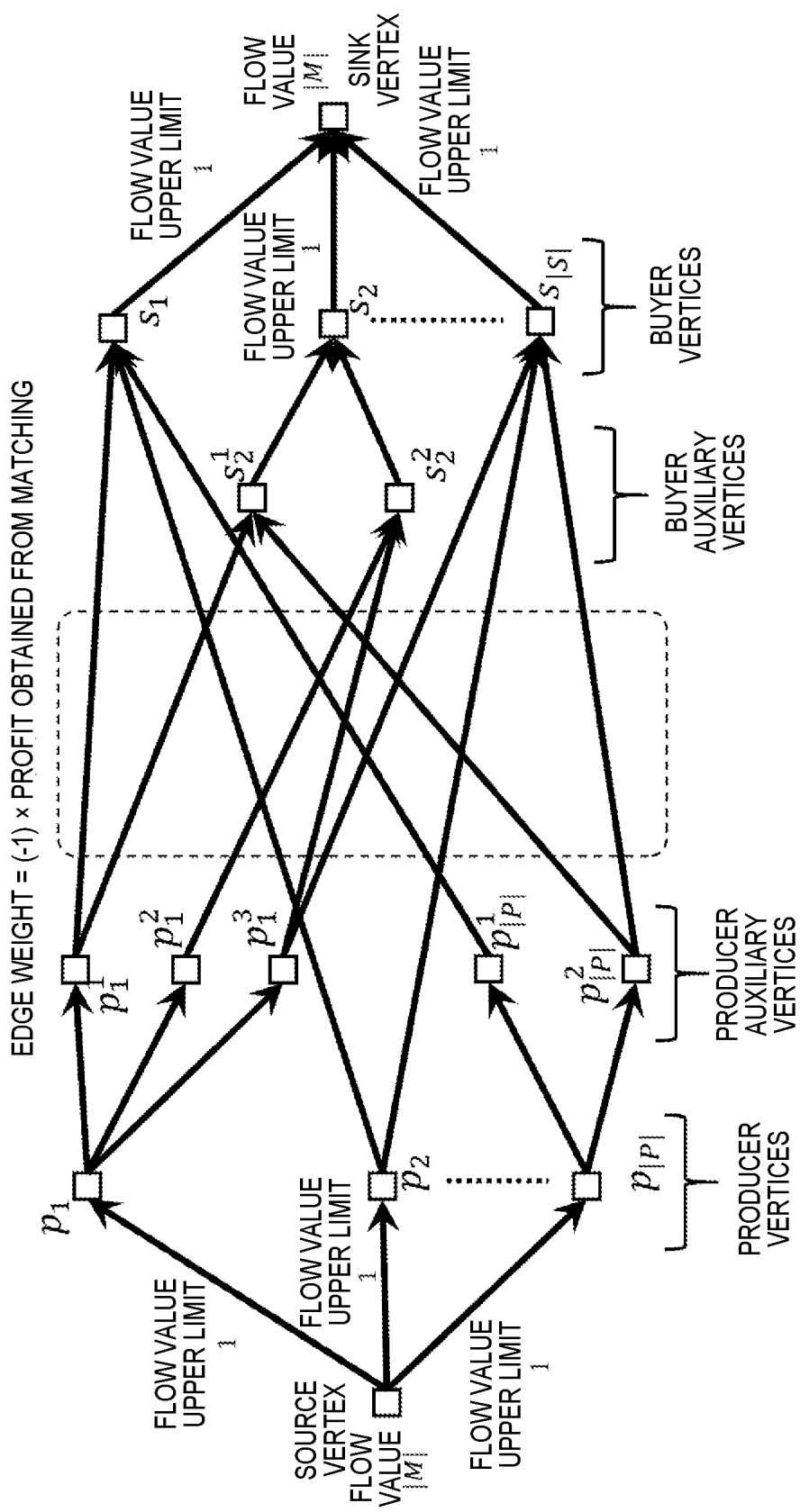
FIG. 7 is a generalization of an example of a profit maximization matching graph (edge-weighted directed graph)

FIG. 7 is a generalization of an example of the profit maximization matching graph (edge-weighted directed graph). The weight of an edge corresponds to the cost per unit flow value incurred in the case of using the edge. The edge weights are set as follows.

For an edge "e" included in "$E^{SUB}$" (where the vertices on either end of the edge "e" are denoted "$u^p_e$" and "$u^s_e$"), let "$prof^e$" be the profit obtained by matching the sell condition (or auxiliary condition) of the producer corresponding to "$u^p_e$" with the buy condition (or auxiliary condition) of the buyer corresponding to "$u^s_e$". At this time, let "$prof^e \times (-1)$" be the edge weight. Consequently, as the profit increases, the weight of the edge "e" becomes smaller. The profit "$prof^e$" is defined as follows, for example.

$prof^e$=(buyer's quantity to buy×buy unit price)−(producer's quantity for sale×sell unit price)−(cost of transport medium×days in transport)

In the above, the buyer's quantity to buy is given by "producer's quantity for sale—amount of waste according to waste rate".

Let 0 be the weight of edges other than the edge "e" included in "$E^{SUB}$".

With respect to the generated profit maximization matching graph, the flow value from the source vertex to the sink vertex is treated as "|M|" and a flow value upper limit having the same value as the maximum matching calculation graph is set to solve a minimum-cost flow problem. That is, the flow that minimizes cost in the case of inputting the flow value "|M|" from the source vertex and running the inputted flow value to the sink vertex is calculated. Details about the algorithm of the minimum-cost flow problem are described further in Non-Patent Literature 1, for example.

As a result of solving the above problem, the edges "e" with a non-zero flow value (that is, the edges through which the calculated flow flows) are specified from among the edges "e" included in "$E^{SUB}$". For the specified edges "e", pairs of the sell condition (or auxiliary condition) of the producer corresponding to "$u^p_e$" and the buy condition (auxiliary condition) of the buyer corresponding to "$u^s_e$" are obtained as matching candidates. The sell conditions and the buy conditions included in the matching candidates are matched to each other. There are "|M|" matching candidates. Hereinafter, the set of matching candidates calculated with respect to the transport medium "k" is denoted "$U^k$". In this way, by treating the sum total profit obtained by matching sell conditions and buy conditions as an indicator to solve the minimum-cost flow problem, the matching candidate generator 104 generates a maximum number of, or at least one, matching candidate that includes a sell condition and a buy condition.

The scheduler 105 assigns the matching candidate(s) included in "$U^k$" to the transport medium "k" selected by the transport medium selector 103 to maximize profit. This operation is called scheduling the transport medium. Assigning a matching candidate to the transport medium "k" means assigning the task of transporting apples to the transport medium "k" according to the sell condition and the buy condition indicated by the matching candidate. The scheduler 105 corresponds to one example of a scheduler that assigns and schedules a task of transporting a product to the transport medium on the basis of at least one matching candidate that includes a sell condition and a buy condition. The scheduler assigns a number of matching candidates less than or equal to the maximum number described above to a transport medium, and assigns a task according to the matching candidate(s) to the transport medium. At this point, by treating the sum total profit obtained by executing the task as an indicator to solve the minimum-cost flow problem, for example, the task to be assigned to the transport medium (or the matching candidate(s) for which to assign a task) is determined.

In the case of assigning a matching candidate to the transport medium "k", the scheduler 105 is capable of assigning (scheduling) a matching candidate only if the following conditions [1] and [2] hold true.

[1] The transport by the transport medium starts within the sell availability period of the producer.

[2] The transport by the transport medium is completed within the buy availability period of the producer.

When determining whether the conditions [1] and [2] hold true, it is also necessary to consider the number of days taken for transport in the loaded state (loaded transport) and the number of days taken for transport in the unloaded state (empty travel). The number of days taken for empty travel corresponds to the number of days taken for the transport medium to travel to the sell location of the producer without carrying the product (apples), for example. The number of days taken for loaded transport corresponds to the number of days taken for the transport medium to travel from the sell location of the producer to the buy location of the buyer (transporting apples). The producer and the buyer specify the sell location and the buy location, and the position of each location is specifiable from the geographical DB_108, while the travel speed of the transport medium is specifiable from the transport medium list. Consequently, the number of days taken for loaded transport and the number of days taken for empty travel can be calculated. Note that in this example, both loaded transport and empty travel are taken to be the same speed, but cases in which loaded transport and empty travel have different speeds are also possible.

However, the above assumes that with loaded transport, deliberately driving the transport medium slowly to gain time is not allowed. Also, with empty travel, it is assumed that the transport medium can arrive at the next transport start location (the sell location of a producer) earlier than the departure date (or departure time) and stand by.

Figure 8:
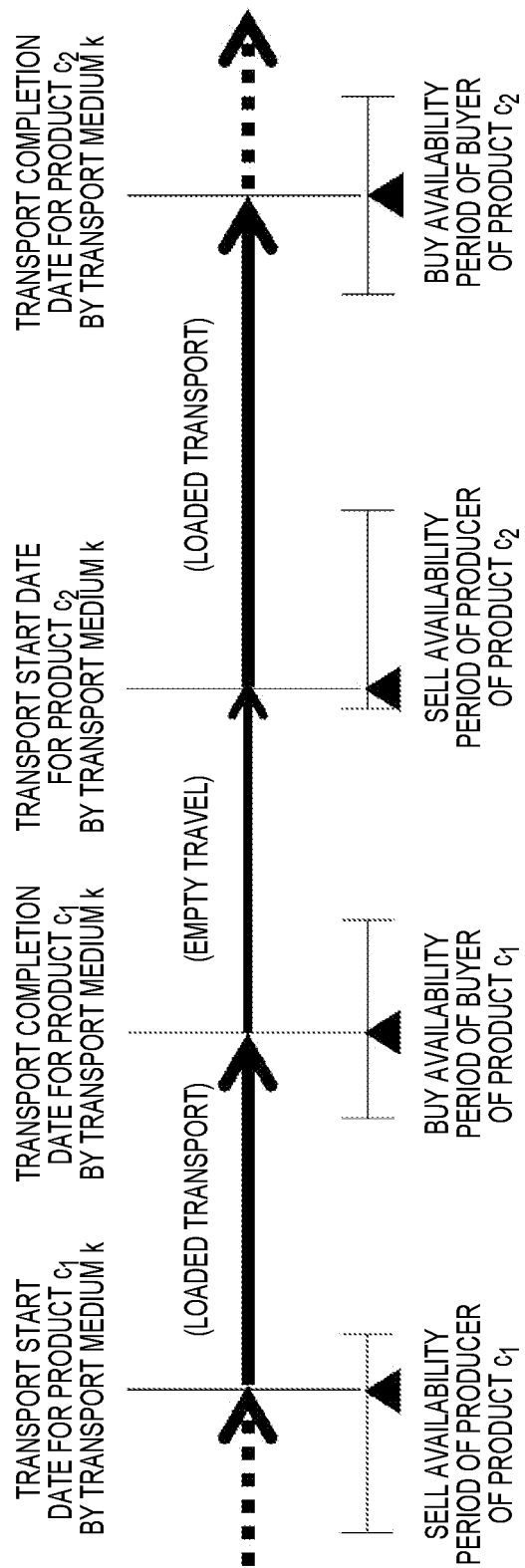
FIG. 8 is a diagram specifically illustrating an example of satisfying various conditions on a transport medium "k"

FIG. 8 illustrates an example of satisfying the conditions [1] and [2] with respect to the transport medium "k". A product "$c_1$" is transported (loaded transport) by the transport medium "k" from the sell location of a producer to the buy location of a buyer. At this time, the transport start date of the product "$c_1$" is included within the sell availability period of the producer of the product "$c_1$", and the buy date of the buyer of the product "$c_1$" (the transport completion date of the product "$c_1$") is included within the buy availability period of the buyer of the product "$c_1$".

The transport medium "k" travels empty to the transport start location (sell location) of a product "$c_2$", and transports the product "$c_2$" (loaded transport) from the sell location of the producer of the product "$c_2$" to the buy location of the buyer of the product "$c_2$". At this time, the transport start date of the product "$c_2$" is included within the sell availability period of the producer of the product "$c_2$", and the buy date of the buyer of the product "$c_2$" (the transport completion date of the product "$c_2$") is included within the buy availability period of the buyer of the product "$c_2$".

The scheduler 105 generates a scheduling graph and solves a minimum-cost flow problem to achieve the scheduling (assigning matching candidates to the transport medium "k") by which the highest profit is obtained.

The scheduling graph is expressed by "$G^s=(V, A)$". Here, "$G^s=(V, A)$" is an edge-weighted directed graph. A vertex set "V" is defined as follows. In the following expression, "$U^k$" is the set of matching candidates, while "r" is a matching candidate and an element of "$U^k$".

$$V = \{\text{source vertex, sink vertex}\} \cup \bigcup_{\forall r \in U^k} \{\text{transport start availability date vertex}\}$$

The source vertex and the sink vertex are vertices corresponding to the entrance and exit of the scheduling graph.

Transport start availability date vertices are vertices corresponding to individual dates within a transport start availability period of the matching candidate "r".

The transport start availability period of a matching refers to the (range of) days for which the transport completion date by the transport medium is included in the buy availability period of the buyer for the matching candidate "r" from among the sell availability period of the producer for the matching candidate "r".

The set of transport start availability date vertices corresponding to the matching candidate "r" is denoted "$V_r$".

The vertex corresponding to the first day among the transport start availability date vertices included in "$V_r$" is denoted "$v^F_r$", while the vertex corresponding to the last such day is denoted "$v^L_r$". For example, in the case where the transport start availability date vertex set "$V_r$" is a set of five vertices corresponding to October 1-5, "$v^F_r$" is the vertex corresponding to October 1 and "$v^L_r$" is the vertex corresponding to October 5.

An edge set "A" of the scheduling graph "$G^s=(V, A)$" is defined as follows.

$$A = \{\text{edge from source vertex to sink vertex}\} \cup \{\text{for all matching candidates "r", the set of edges from the source vertex to } v^F_r\} \cup \{\text{for all matching candidates "r", the set of edges from } v^L_r \text{ to the sink vertex}\} \cup A^{SUB}$$

In the above expression, "$A^{SUB}$" is the set of edges between the transport start availability date vertices, and includes a set ("$A^{SUB1}$") of edges generated inside each individual matching candidate "r" and a set ("$A^{SUB2}$") of edges connecting two different matching candidates "$r_1$" and "$r_2$" (where "$r_1$" and "$r_2$" are different). In other words, "$A^{SUB}=A^{SUB1} \cup A^{SUB2}$", [Method of generating "$A^{SUB1}$"]

Let "r" be a matching candidate. Also, let $[v^r_1, \ldots, v^r_p]$ be the vertices of the transport start availability date vertex set "$V_r$", arranged in date order. In this case, "$A^{SUB1}$" is given by the following expression.

$$A^{SUB2} = \bigcup_{\forall r} \bigcup_{i=1}^{p-1} \{\text{edge from } v_i^r \text{ to } v_{i+1}^r\}$$

Method of Generating "$A^{SUB2}$"

Let "$r_1$" and "$r_2$" (where "$r_1$" and "$r_2$" are different) be any two different matching candidates.

Let $[v^{r1}_1, \ldots, v^{r1}_i, \ldots, v^{r1}_p]$ be the vertices of a transport start availability date vertex set "$V_{r1}$" in the matching candidate "$r_1$", arranged in date order.

Let $[v^{r2}_1, \ldots, v^{r2}_i, \ldots, v^{r2}_p]$ be the vertices of a transport start availability date vertex set "$V_{r2}$" in the matching candidate "$r_2$", arranged in date order.

The date corresponding to a vertex "v" is denoted "date (v)".

The number of days in transport from a transport start location to a transport completion location in the matching candidate "r" is denoted "day(r)".

Provided that "$pos^p_r$" is the transport start location and "$pos^s_r$" is the transport completion location of a matching candidate "r", for different matching candidates "$r_1$" and "$r_2$", the number of days (empty travel days) required for the transport medium "k" to travel from "$pos^p_{r1}$" to "$pos^p_{r2}$" is given by $$day(r_1,r_2) = \text{moveDay}^{possr1,pospr2,k}$$

Similarly, the number of days (loaded transport days) taken for the transport medium "k" to travel from the transport start location to the transport completion location in a single matching candidate "r" is given by $$day(r) = \text{moveDay}^{pospr,possr,k}$$

In the present embodiment, the loaded transport speed and the empty travel speed are assumed to be the same, but the loaded transport speed and the empty travel speed may also be different in some cases.

On the basis of the above assumptions, the scheduler 105 generates edges joining different matching candidates as follows.

In the case where
$\text{date}(v_p^{r1}) + \text{day}(r_1) + \text{moveDay}^{possr1,pospr2,k} \leq \text{date}(v_1^{r2})$, an edge from the vertex "$v_p^{r1}$" to the vertex "$v_1^{r2}$" is generated.

Figure 9:
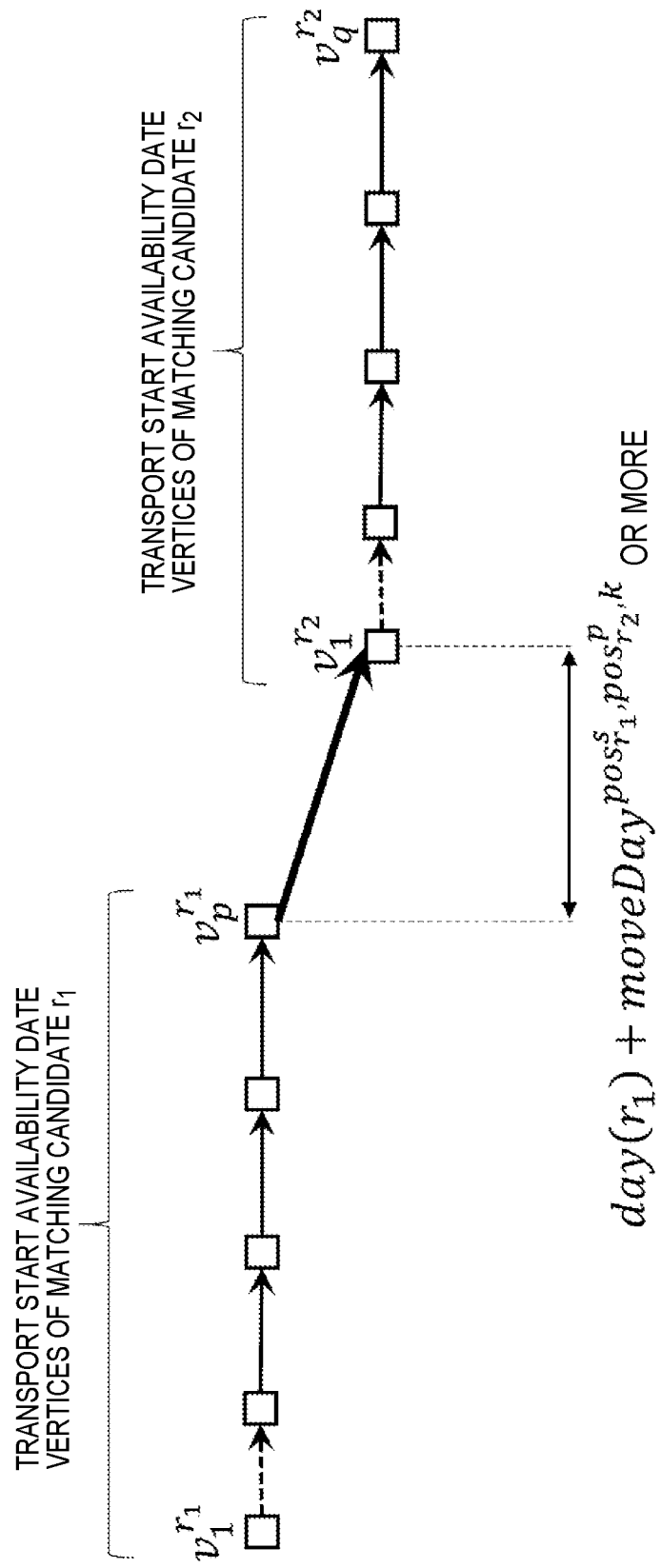
FIG. 9 is a diagram illustrating an example of generating an edge from a vertex "$v_p^{r1}$" to a vertex "$v_1^{r2}$"

FIG. 9 illustrates an example of generating an edge from the vertex "$v_p^{r1}$" to the vertex "$v_1^{r2}$". Here, "day($r_1$)" and "day($r_1, r_2$)" are added to the date "date($v_p^{r1}$)" corresponding to the end "$v_p^{r1}$" of the transport start availability date vertices of the matching candidate "$r_1$". Here, "day($r_1$)" is the number of days taken to travel from the transport start location to the transport completion location in the matching candidate "$r_1$". Also, "day($r_1, r_2$)" is the number of days taken to travel (empty travel) from the buy location of the matching candidate "$r_1$" to the sell location of the matching candidate "$r_2$". In the case where the added days are on or before the date "date($v_1^{r2}$)" corresponding to the start "$r_1^{r2}$" of the transport start availability date vertices of the matching candidate "$r_2$", an edge from the vertex "$v_p^{r1}$" to the vertex "$v_1^{r2}$" is generated. The generated edge is illustrated with a bold arrow.

In other cases, for any combination of "i, j" where $\text{date}(v_i^{r1}) + \text{day}(r_1) + \text{moveDay}^{possr1,pospr2,k} = \text{date}(v_j^{r2})$ holds true, an edge from the vertex "$v_i^{r1}$" to the vertex "$v_j^{r2}$" is generated.

Figure 10:
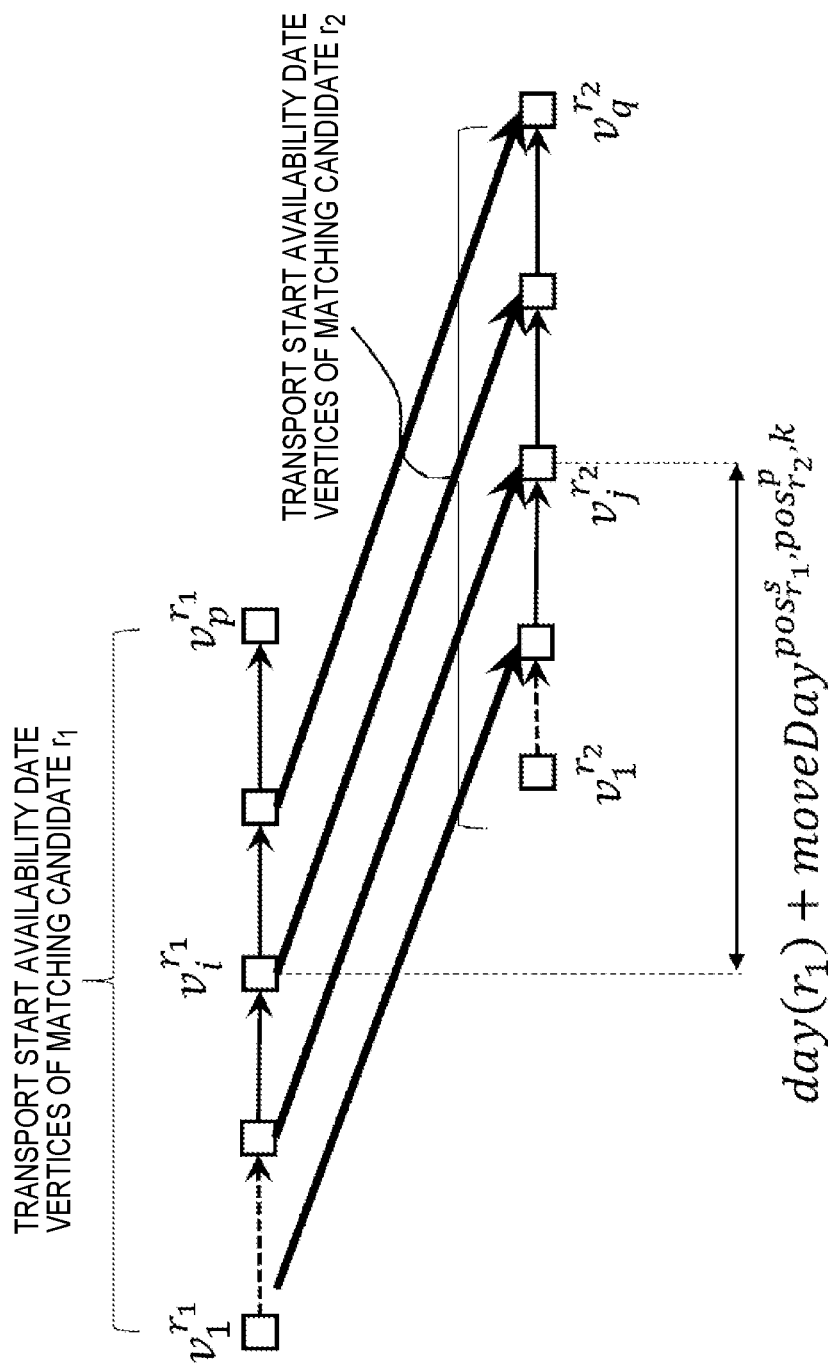
FIG. 10 is a diagram illustrating an example of generating an edge from a vertex "$v_i^{r1}$" to a vertex "$v_j^{r2}$"

FIG. 10 illustrates an example of generating an edge from the vertex "$v_i^{r1}$" to the vertex "$v_j^{r2}$". Here, "day($r_1$)" and "day($r_1, r_2$)" are added to the date "date($v_i^{r1}$)" corresponding to the transport start availability date vertex "$v_i^{r1}$" of the matching candidate "$r_1$". Here, "day($r_1$)" is the number of days taken to travel from the transport start location to the transport completion location in the matching candidate "$r_1$". Also, "day($r_1, r_2$)" is the number of days taken to travel (empty travel) from the buy location of the matching candidate "$r_1$" to the sell location of the matching candidate "$r_2$". Edges are generated from the vertex "$v_i^{r1}$" to the transport start availability date vertex "$v_j^{r2}$" of the matching candidate "$r_2$" having a date that matches with the added days. The generated edges are illustrated with bold arrows (in the illustrated example, four arrows).

The edge weights are set according to the following method for edges where the downstream connection is a vertex of a matching candidate.

For edges where the downstream connection is not a vertex of a matching candidate, the edge weight is set to 0.

Provided that "r" is a matching candidate connected upstream from the edge and "m" is a matching candidate connected downstream from the edge, the edge weight "w" is $$-1 \times (\text{prof}^{m,k} - \text{moveCost}^{possr,pospm,k} + \alpha)$$

where "k" represents the transport medium.

Here, "$\text{prof}^{m,k}$" is the profit obtained by matching the matching candidate "m", "$pos^s_r$" is the transport completion location for the matching candidate "r" connected upstream from the edge, and "$pos^p_m$" is the transport start location for the matching candidate "m" connected downstream from the edge.

The term $$\text{moveCost}^{possr,pospm,k}$$

is the cost required for the transport medium "k" to travel (empty travel) from the transport completion location "$pos^s_r$" for the matching candidate "r" to the transport start location "$pos^p_m$" for the matching candidate "m". Separately, in the case where an initial position ($q_v$) of the transport medium is usable as input information and the upstream connection of an edge is the source vertex, the empty travel cost from the initial position "$q_v$" to the transport start location can be used.

Also, "$\alpha$" is an arbitrary constant. If "$\alpha$" is a sufficiently large value, a result that assigns the matching candidate "m" to the transport medium will be obtained even if the matching candidate "m" is a red matching that would result in negative profit if performed. In other words, assigning more matching candidates would be prioritized over profit. On the other hand, if "$\alpha$" is set to 0, the assignment result that yields the maximum profit is always obtained.

Specifically, in the case of setting "$\alpha$" to a sufficiently large value, it is sufficient to set "$\alpha$" satisfying the following expression.

$$\alpha > b^{MAX} - Z^{MIN} \text{ where "}\alpha=0\text{" is set if "}\alpha \leq 0\text{"}$$

Here, "$b^{MAX}$" is the maximum value of the empty travel cost between seller and buyer, and "$Z^{MIN}$" is the minimum value of the profit obtained from a matching candidate.

Figure 11:
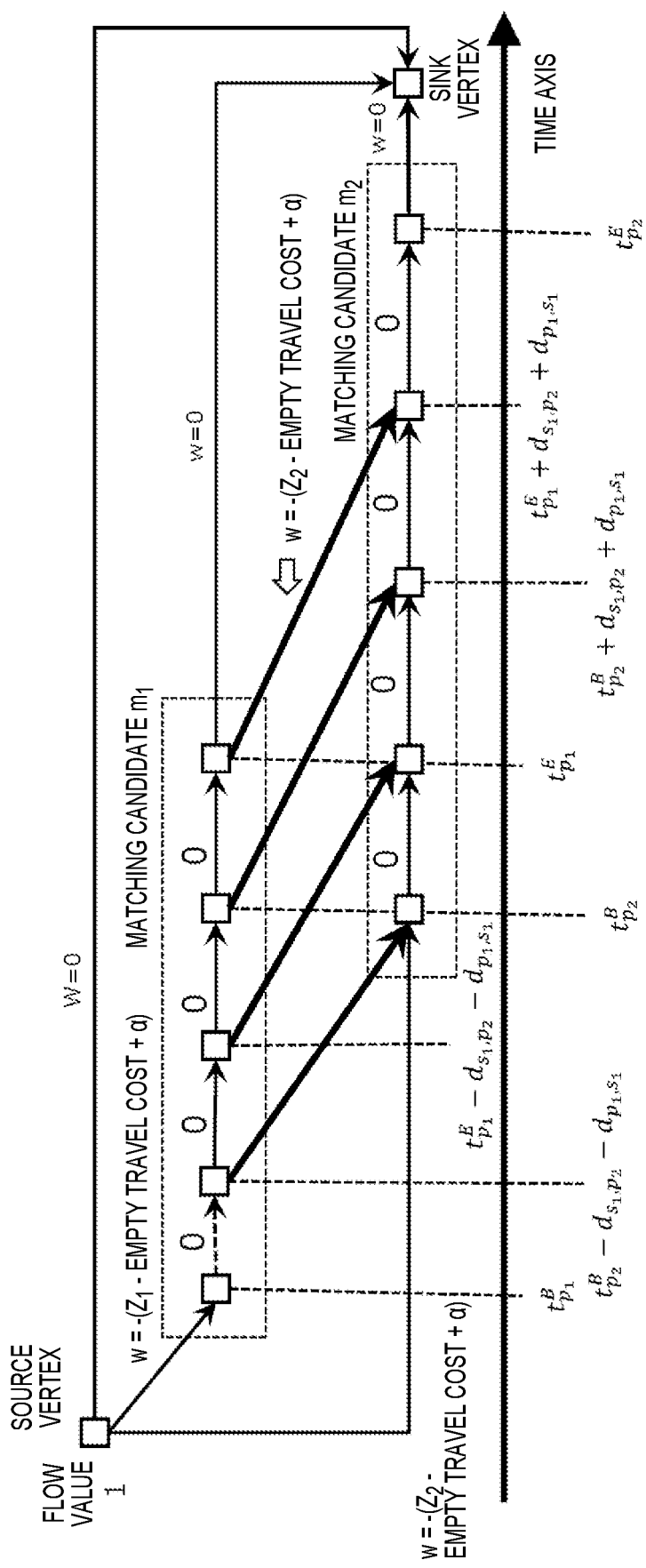
FIG. 11 is a diagram illustrating an example of a scheduling graph.

FIG. 11 is an example of a scheduling graph generated in the case where two matching candidates are generated by the matching candidate generator 104. In FIG. 11, the two matching candidates are "$m_1$" and "$m_2$".

The times (dates) corresponding to the vertices inside the transport start availability date vertex set of the matching candidates "$m_1$" and "$m_2$" are indicated using various symbols. Hereinafter, these symbols will be explained using FIG. 12.

Figure 12:
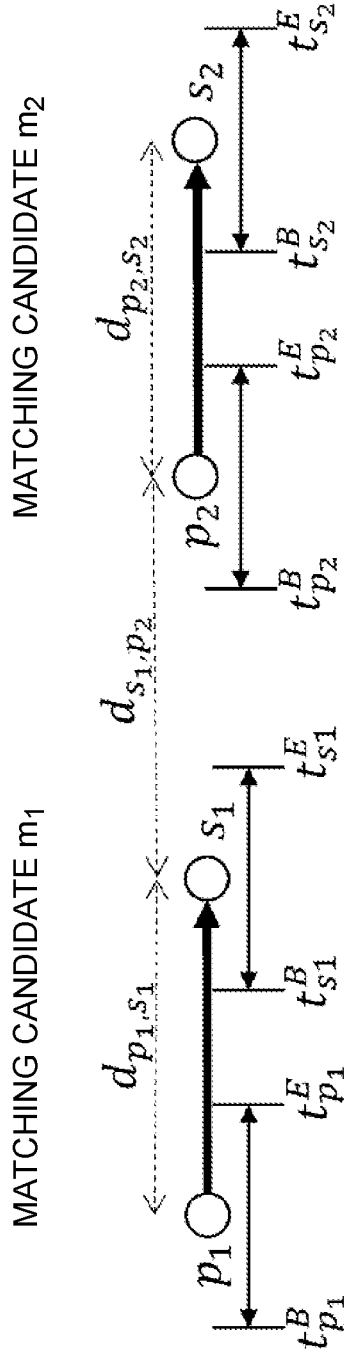
FIG. 12 is a diagram for explaining various symbols.

The left side of FIG. 12 schematically illustrates, for the matching candidate "$m_1$", starting the transport of the product (apples) of the producer "$p_1$" between "$t^B_{p1}$" and "$t^E_{p1}$", and completing the transport between "$t^B_{s1}$" and "$t^E_{s1}$" for the buyer "$s_1$". The right side of FIG. 12 schematically illustrates, for the matching candidate "$m_2$", starting the transport of the product (apples) of the producer "$p_2$" between "$t^B_{p2}$" and "$t^E_{p2}$", and completing the transport between "$t^B_{s2}$" and "$t^E_{s2}$" for the buyer "$s_2$".

Here, "$t^B_{p1}$" denotes the date corresponding to the first vertex among the transport start availability date vertices of the matching candidate "$m_1$", and "$t^E_{p1}$" denotes the date corresponding to the last vertex among the transport start availability date vertices of the matching candidate "$m_1$".

Also, "$t^B_{s1}$" denotes the date corresponding to the first vertex among the buy availability start date vertices of the matching candidate "$m_1$", and "$t^E_{s1}$" denotes the date corresponding to the last vertex among the transport start availability date vertices of the matching candidate "$m_1$".

Also, "$t^B_{p2}$" denotes the date corresponding to the first vertex among the transport start availability date vertices of the matching candidate "$m_2$", and "$t^E_{p2}$" denotes the date corresponding to the last vertex among the transport start availability date vertices of the matching candidate "$m_2$".

Also, "$t^B_{s2}$" denotes the date corresponding to the first vertex among the buy start availability date vertices of the matching candidate "$m_2$", and "$t^E_{s2}$" denotes the date corresponding to the last vertex among the transport start availability date vertices of the matching candidate "$m_2$".

In addition, "$d_{p1,s1}$" is the length of time (period) from starting the transport of the product (apples) at the sell location of the producer "$p_1$" to completing the transport at the buy location of the buyer "$s_1$".

Also, "$d_{p2,s2}$" is the length of time (period) from starting the transport of the product (apples) at the sell location of the producer "$p_2$" to completing the transport at the buy location of the buyer "$s_2$".

Also, "$d_{s1,p2}$" is the length of time (period) taken to travel (empty travel) from the buy location of the buyer "$s_1$" to the sell location of the producer "$p_2$".

In the scheduling graph in FIG. 11, "$Z_1$" denotes the profit in the case of executing the matching candidate "$m_1$", and "$Z_2$" denotes the profit in the case of executing the matching candidate "$m_2$".

Figure 13:
FIG. 13 is a diagram for specifically explaining a profit "$Z_1$" and a profit "$Z_2$"

FIG. 13 is a diagram for specifically explaining the profits "$Z_1$" and "$Z_2$". The profit "$Z_1$" is the profit ($prof^{m1,k}$) for the matching candidate "$m_1$" in the case of purchasing the product (apples) at the sell location of the producer "$p_1$", transporting the product to the buy location of the buyer "$s_1$", and marketing the transported apples to the buyer "$s_1$". The profit "$Z_12$" is the profit ($prof^{m2,k}$) for the matching candidate "$m_2$" in the case of purchasing the product (apples) at the sell location of the producer "$p_2$", transporting the product to the buy location of the buyer "$s_2$", and marketing the transported apples to the buyer "$s_2$".

Note that marketing the transported apples to the buyer "$s_2$" means at least handing over the apples to the buyer or a representative, or simply placing the apples in a location specified by the buyer. The sales contract itself may be agreed upon before transport, when handing the apples over to the buyer, or at some other timing. Similarly, purchasing the apples from the producer means at least receiving the apples from the producer or a representative, or simply acquiring the apples from a location specified by the producer. The sales contract itself may be agreed upon before transport, when receiving the apples, or at some other timing.

In the scheduling graph in FIG. 11, the weight ("w") of the edges between the vertices in the transport start availability date vertex set of the matching candidate "$m_1$" is 0 because the downstream connections of the edges are not a matching candidate. Similarly, the weight ("w") of the edges between the vertices in the transport start availability date vertex set of the matching candidate "$m_2$" is also 0 because the downstream connections of the edges are not a matching candidate. The weight ("w") of the edge from the source vertex to the sink vertex is 0 because the downstream connection is not a matching candidate. The weight ("w") of the edge between the last vertex in the transport start availability date vertex set of the matching candidate "$m_1$" to the sink vertex is also 0 because the downstream connection of the edge is not a matching candidate. The weight of the edge from the source vertex to the first vertex of the matching candidate "$m_1$" is "-($Z_1$-empty travel cost+$\alpha$)". The weight of the edge from the source vertex to the first vertex of the matching candidate "$m_2$" is "-($Z_2$-empty travel cost+$\alpha$)". The weight of the edges between the matching candidates "$m_1$" and "$m_2$" is "-($Z_2$-empty travel cost+$\alpha$)".

By solving a minimum-cost flow problem when running a flow value 1 from the source vertex to the sink vertex in the generated scheduling graph (see FIG. 11), the scheduler 105 determines a schedule for the transport medium "k". In the scheduling graph, no edge with a set upper limit on the flow value exists, and therefore a single path from the source vertex to the sink vertex is necessarily determined. Paths from the source vertex to the sink vertex are following sequentially, and when passing through a vertex ($v_r \in V_r$), the corresponding matching candidate "r" is assigned to the transport medium. A specific example will be illustrated using FIG. 14.

Figure 14:
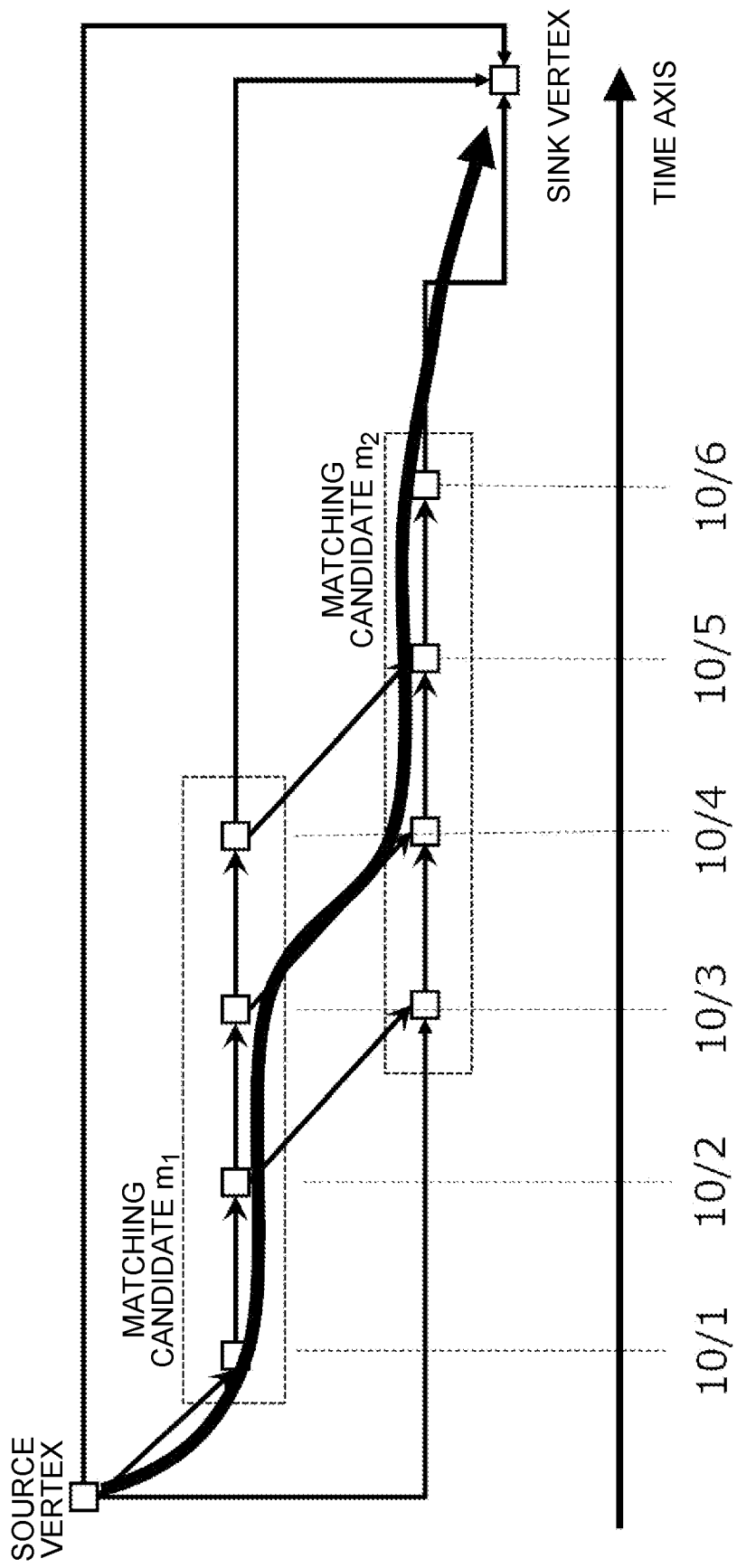
FIG. 14 is a diagram illustrating an example of a path obtained as a result of solving a minimum-cost flow problem.

FIG. 14 illustrates an example of a path obtained as a result of solving the minimum-cost flow problem. In this example, the schedule for the transport medium "k" to be calculated has the following result.

Initial position ("$q_v$")→(empty travel)→perform matching candidate "$m_1$"→(empty travel)→perform matching candidate "$m_2$"

Provided that "$v_i^{r1}$" is the first vertex included in the vertex group (transport start availability date vertex set) "$V_r$" that the path passes through, the date when each matching candidate is started is expressed by "date($v_i^{r1}$)". In the case of the example of FIG. 14, transport is started on October 1 for the matching candidate "$m_1$". Transport is started on October 4 for the matching candidate "$m_2$".

The result output device 107 outputs the matching candidates assigned to the transport medium "k" and the transport schedule of the transport medium "k" as the result of the processing by the scheduler 105. For example, the result output device 107 displays the matching candidates and the transport schedule on the screen of a display device. The result output device 107 may also transmit the matching candidates and the transport schedule to an external device through wired or wireless communication. Additionally, the result output device 107 may also store the matching candidates and the transport schedule in an internal or external storage device. The storage device may be a recording medium of any type, such as a memory device, a hard disk device, or an optical disc device.

The post-processor 106 removes sell conditions and buy conditions included in the matching candidates assigned to the transport medium "k" in the result of the processing by the scheduler 105 from the producer list and the buyer list. In the case where a matching candidate not assigned to the transport medium "k" exists, the post-processor 106 keeps the sell condition and buy condition included in the unassigned matching candidate without removing the conditions from the producer list and the buyer list. With this arrangement, the sell condition and buy condition in an unassigned matching candidate may be assigned as part of a new matching candidate to the transport medium to be calculated next or later.

Figure 15:
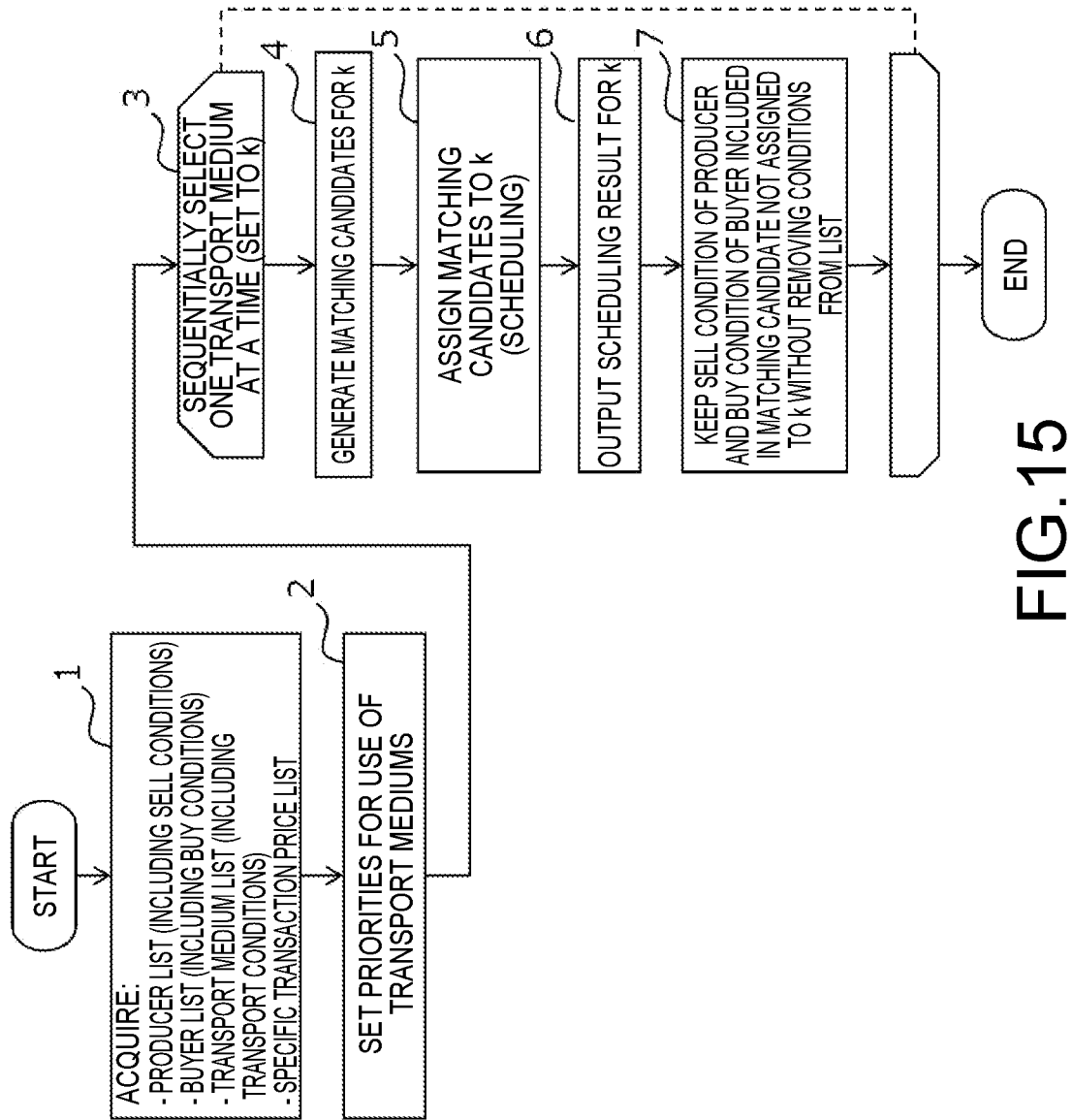
FIG. 15 is a flowchart of an example of operations by the transport plan apparatus according to the embodiment.

FIG. 15 is a flowchart of an example of operations by the transport plan apparatus 100 according to the embodiment. The input data acquirer 101 acquires the producer list, the buyer list, the transport medium list, and the specific transaction price list from internal storage or an external device (step 1). The priority determiner 102 determines priorities of transport mediums to be selected on the basis of the transport medium list (step 2). The transport medium selector 103 selects a transport medium on the basis of the priorities (step 3). Let the transport medium "k" be the selected transport medium. The matching candidate generator 104 generates one or more matching candidates combining one each of a sell condition from the producer list and a buy condition from the buyer list that matches the sell condition, on the basis of information about the transport medium "k" (step 4). The scheduler 105 assigns tasks according to the generated matching candidates to the transport medium "k" as task scheduling for the transport medium "k" (step 5). The result output device 107 outputs data indicating the scheduling result (step 6). The post-processor 106 removes sell conditions and buy conditions included in the matching candidates assigned to the transport medium "k" from the producer list and the buyer list. In the case where a matching candidate not assigned to the transport medium "k" exists, the post-processor 106 keeps the sell condition and buy condition included in the unassigned matching candidate without removing the conditions (step 7). Returning to step 3, thereafter, the next transport medium is selected (step 3), and steps 4 to 7 are executed again. If an end condition is established, the process ends. The end condition is when no transport medium to be selected exists, or when no more entries exist in at least one of the producer list or the buyer list, for example.

According to the present embodiment above, at least the producer list, the buyer list, and the transport medium list are inputted, and a plurality of matching candidates matching the sell conditions of the producers with the buy conditions of the buyers are generated. A delivery schedule is generated by assigning some or all of the plurality of matching candidates to a transport medium to maximize profit. This arrangement makes it possible to maximize or optimize the profit from a business that purchases a product from a producer to transport and market the product to a buyer.

The present embodiment can retain the possibility of assigning the sell condition and buy condition included in a matching candidate not assigned to a certain transport medium to the transport medium to be selected next as part of a new matching candidate. With this arrangement, the profit can be maximized further.

According to the present embodiment, detailed conditions (such as the quantity to buy, the unit price, the buy availability period, and the quality) are set as the sell conditions of producers and the buy conditions of buyers. With this arrangement, matching that maximizes profit further is possible.

According to the present embodiment, a plurality of selectable sell conditions are prepared (for example, the product price is changed depending on other conditions (such as the quality and quantity) of the product), and by selecting one of the sell conditions to use for matching, matching that maximizes profit further is possible.

According to the present embodiment, by setting a specific sell unit price (specific transaction price) as the sell condition to be applied only between a specific buyer and a specific seller, matching that maximizes profit further is possible. By setting a specific buy unit price (specific transaction price) as the buy condition to be applied only between a specific buyer and a specific seller, matching that maximizes profit further is possible.

Modification 1

In the present embodiment, the priority determiner 102 determines the priorities of transport mediums using any single selection criterion, but in the case where there is a small number of transport mediums (for example, a fixed number or less) or the case where there is ample calculation time, the transport schedule may also be generated using a plurality of selection criteria. In this case, it is sufficient to adopt the transport medium obtained from the transport schedule that ultimately yields the most favorable profit.

Modification 2

In the present embodiment, the maximum number of matching candidates to generate is calculated, and the set of matching candidates yielding the maximum total sum of the profits obtained through matching is determined on the basis of a constraint on the maximum number. In other words, the matching candidates are calculated to achieve the maximum number of matching candidates and also the maximum profit. As the present modification, a set of matching candidates may be generated simply to maximize the total sum of the profits from the matching candidates. In other words, the set of matching candidates may be generated such that the number of candidates is not guaranteed to be the maximum, but simply to maximize the total sum of the profits.

Modification 3

In the embodiment described above, matching candidates (matching information) combining a sell condition and a buy condition are assigned to a transport medium, but the matching candidates may also be thought of as transport requests. When given transport requests (including a loading location, an unloading location, the profit obtained from fulfilling the transport request, and a set of usable transport mediums, for example) and transport medium information, the scheduling problem of assigning transport requests to transport mediums is a known problem. In the present modification, assigning transport requests to transport mediums is thought of as a "resource-constrained scheduling problem" in which a "resource" set in the transport request is consumed.

The consumption of the "resource" refers to the consumption of the resources "$s_1$" and "$p_1$" in the case of fulfilling the transport request "$r_1$", and the consumption of the resources "$s_1$" and "$p_2$" in the case of fulfilling the transport request "$r_2$", for example. Initially, one each of the resources "$s_1$"

and "$p_1$" exists. In this case, assigning both the transport request "$r_1$" and the transport request "$r_2$" to a transport medium is not possible because only one resource "$s_1$" exists.

In the resource-constrained scheduling problem, consider the case where two usable resources "s" (where "s∈S") and "p" (where "p∈P") are set in each transport request. Furthermore, assume that "P" and "S" are respective sets of resources, such that "P∩S=φ" (resources shared in common between "P" and "S" do not exist). In the case of a problem limited by such conditions in this way, if the usable resource "p" is treated as the producers of a product and the usable resource "s" is treated as the buyers of the product, the maximum matching calculation graph in FIG. 6 and the profit maximization matching graph in FIG. 7 can be created. Consequently, the method of the present embodiment described above can be used as-is to solve the resource-constrained scheduling problem.

In the example described above, there are two usable resources consumed by each transport request, but it is also possible to accommodate the case where a transport request consuming one or fewer usable resources exists. In this case, it is sufficient to remove the flow value upper limit of 1 from the edges having a flow upper limit of 1 in the maximum matching calculation graph in FIG. 6 and the profit maximization matching graph in FIG. 7, and also set a flow value upper limit of 1 on the edges between a producer vertex and a buyer vertex.

For example, in the case where a transport request "r" consumes only the resource "$s_1$", a virtual producer "$p_∞$" is supposed, and an edge from the source vertex to the "$p_∞$" vertex with no flow value upper limit is created. A flow value upper limit of 1 is set on the edge from the "$p_∞$" vertex to the "$s_1$" vertex. The flow value upper limit of 1 is set on the edges between a producer vertex and a buyer vertex to keep the maximum flow value from going to infinity (such that each transport request is scheduled only once), even in cases where there are transport requests that do not consume usable resources.

A practical example of a resource-constrained scheduling problem is the case where the product to be transported is precision equipment, and the resources are necessary workers and tools. In the case where the product is precision equipment, specialist workers and tools are necessary.

Figure 16:
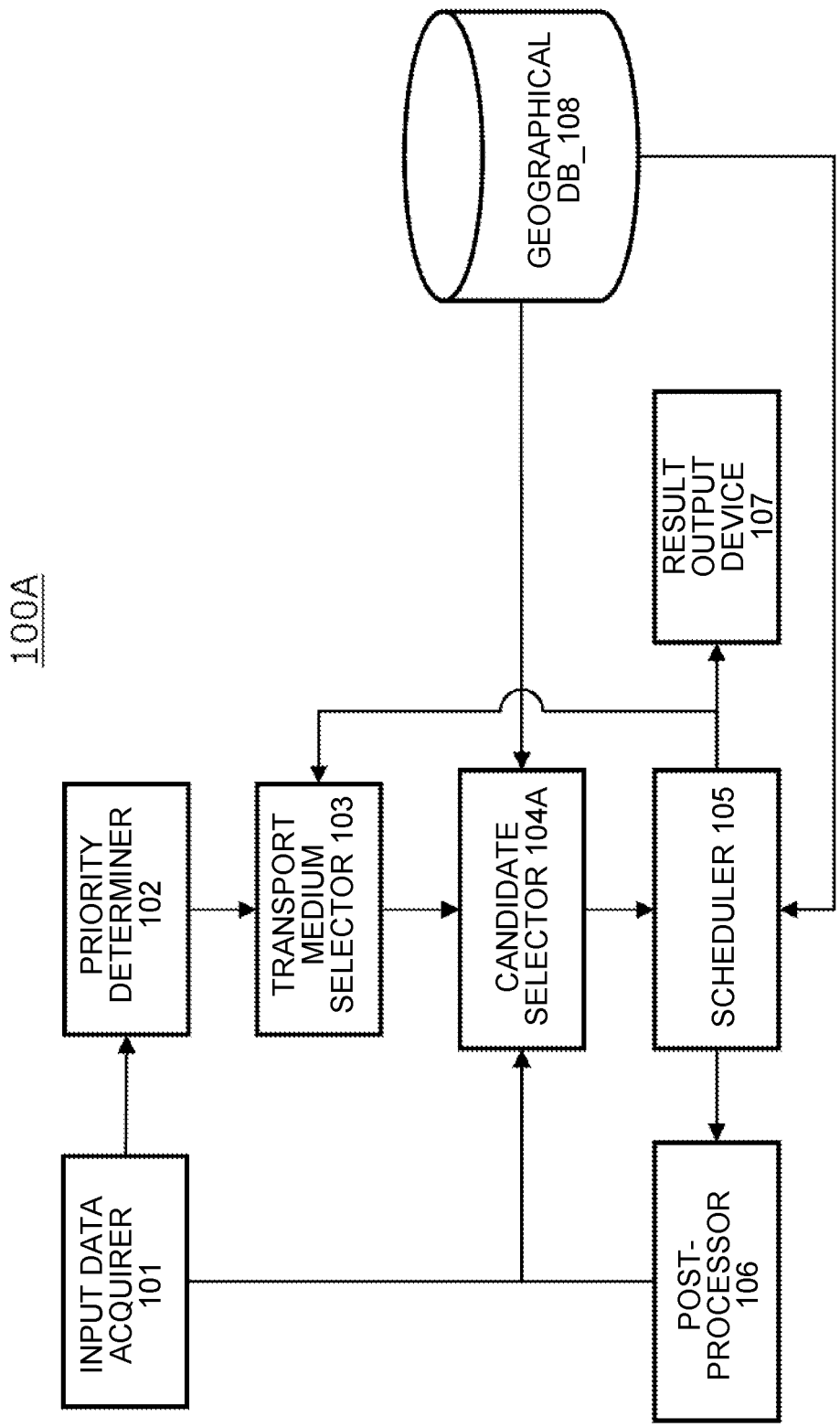
FIG. 16 is a block diagram of a transport plan apparatus as an information processing apparatus according to Modification 3.

FIG. 16 is a block diagram of a transport plan apparatus 100A as an information processing apparatus according to Modification 3. The matching candidate generator 104 in FIG. 1 has been replaced with a candidate selector (selector) 104A. Elements that are the same as FIG. 1 are denoted with the same reference numerals, and a detailed description of such elements is omitted except for modified or expanded processes. Hereinafter, only the differences from the embodiment described earlier will be described.

The input data acquirer 101 acquires data of at least one transport request including a resource to be used in the transport of the product. The transport request may also include multiple types of resources. Also, a transport request may not include a resource in some cases. Here, the transport request is assumed to include two types of resources (a first resource and a second resource). The first resource is assumed to be the producer of the product (first dealer), and the second resource is assumed to be the buyer of the product (second dealer). Besides the resource(s) to be used, the transport request may also include information such as a loading location, an unloading location, the profit obtained from fulfilling the transport request, and a usable transport medium, for example.

The candidate selector 104A selects at least one transport request as a transport request candidate on the basis of information about the transport medium that transports the product and a resource-related constraint. One example of the resource-related constraint is the number of usable resources. In the case where there are multiple types of resources, a constraint may exist for each type. The information about the resource-related constraint and the information about the transport medium may be acquired by the input data acquirer 101. The candidate selector 104A may also select the transport request candidate by creating the maximum matching calculation graph in FIG. 6, for example. For example, the candidate selector 104A may treat the first resource as the producer of the product and the second resource as the buyer of the product to create the maximum matching calculation graph in FIG. 6.

The scheduler 105 schedules transport by assigning the transport of the product to a transport medium on the basis of the transport request candidates. For example, the scheduler 105 assigns transport request candidates and schedules transport by creating the profit maximization matching graph in FIG. 7. By substituting the matching candidates in the embodiment described earlier with transport request candidates, a process similar to the embodiment described earlier is possible.

Hardware Configuration

Figure 17:
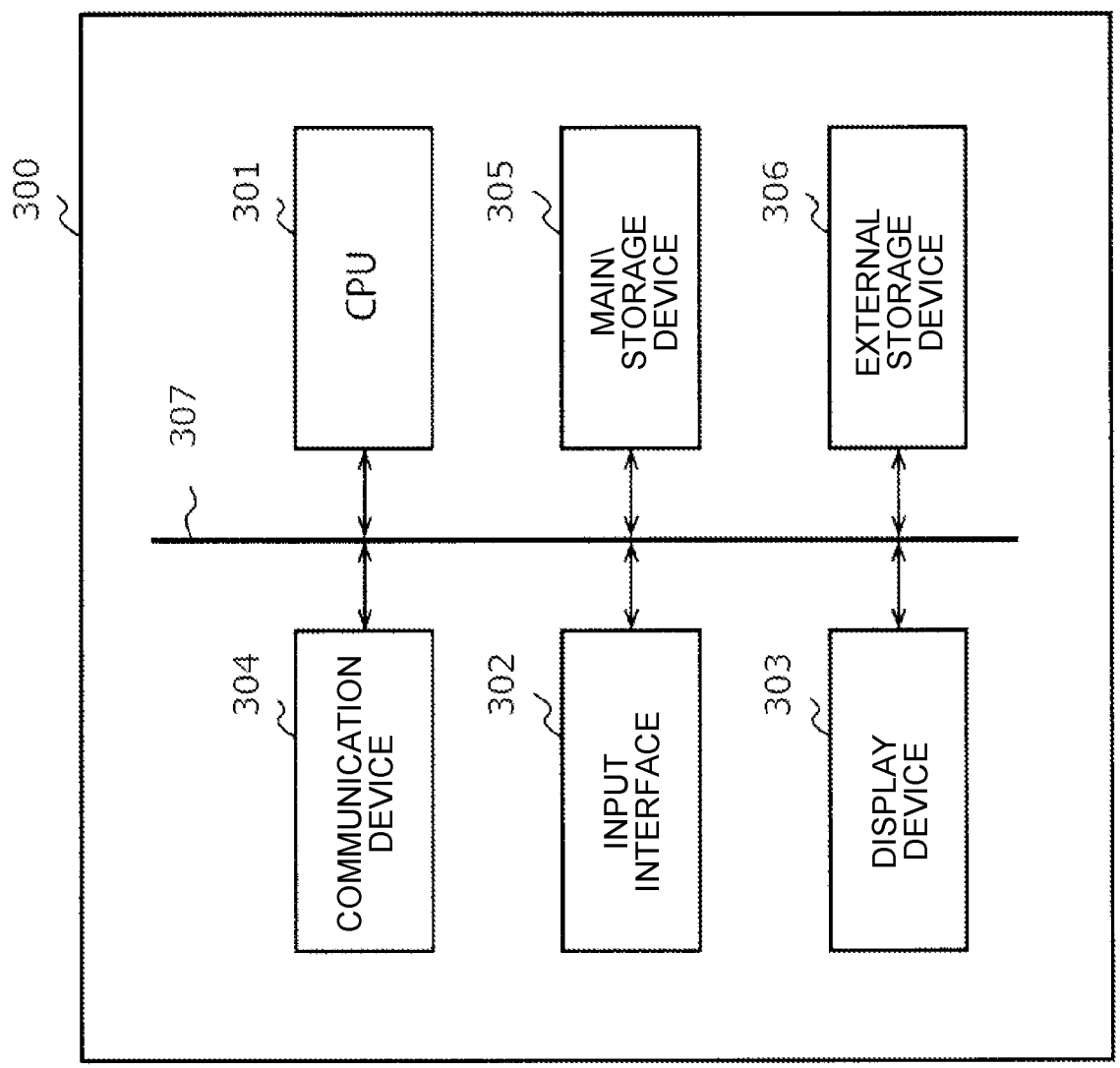
FIG. 17 is a diagram illustrating a hardware configuration of a transport plan apparatus (information processing apparatus).

FIG. 17 illustrates a hardware configuration of the transport plan apparatus 100. The transport plan apparatus 100 is configured as a computer device 300. The computer device 300 includes a CPU 301, an input interface 302, a display device 303, a communication device 304, a main storage device 305, and an external storage device 306, and these components are mutually connected through a bus 307.

The CPU (central processing unit) 301 executes a transport plan program as a computer program on the main storage device 305. The transport plan program is a computer program configured to achieve each above-described functional component of the present device. The transport plan program may be achieved by a combination of a plurality of computer programs and scripts instead of one computer program. Each functional component is achieved as the CPU 301 executes the transport plan program.

The input interface 302 is a circuit for inputting, to the present device, an operation signal from an input device such as a keyboard, a mouse, or a touch panel. The input interface 302 corresponds to the inputter 105.

The display device 303 displays data output from the present device. The display device 303 is, for example, a liquid crystal display (LCD), an organic electroluminescence display, a cathode-ray tube (CRT), or a plasma display (PDP) but is not limited thereto. Data output from the computer device 300 can be displayed on the display device 303.

The communication device 304 is a circuit for the present device to communicate with an external device in a wireless or wired manner. Data can be input from the external device through the communication device 304. The data input from the external device can be stored in the main storage device 305 or the external storage device 306.

The main storage device 305 stores, for example, the transport plan program, data necessary for execution of the transport plan program, and data generated through execution of the transport plan program. The transport plan program is loaded and executed on the main storage device 305. The main storage device 305 is, for example, a RAM, a DRAM, or an SRAM but is not limited thereto. Each storage or database in the transport plan apparatus may be implemented on the main storage device 305.

The external storage device 306 stores, for example, the transport plan program, data necessary for execution of the transport plan program, and data generated through execution of the transport plan program. The transport plan program and the data are read onto the main storage device 305 at execution of the transport plan program. The external storage device 306 is, for example, a hard disk, an optical disk, a flash memory, or a magnetic tape but is not limited thereto. Each storage or database in the transport plan apparatus may be implemented on the external storage device 306.

The transport plan program may be installed on the computer device 300 in advance or may be stored in a storage medium such as a CD-ROM. Moreover, the transport plan program may be uploaded on the Internet.

The present device may be configured as a single computer device 300 or may be configured as a system including a plurality of mutually connected computer devices 300.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information processing apparatus for maximizing a profit of a trading entity engaged in a business of buying products from a first dealer and selling and transporting the bought products to a second dealer, comprising:
    input data acquisition circuitry configured to acquire a plurality of sell conditions under which a plurality of first dealers sell products, a plurality of buy conditions under which a plurality of second dealers buy the products, and a transport medium list including information on a plurality of first transport mediums being able to be used to transport the products; and
    processing circuitry configured to
        combine each of the sell conditions with one of the buy conditions which is matched with each of the sell conditions to generate a plurality of matching information each including the sell condition and the buy condition combined with the sell condition;
        assign a transport of the product in each of the plurality of matching information to one of the first transport mediums selected from the transport medium list; and
        perform scheduling of the transport of the product from the first dealer to the second dealer in each of the plurality of matching information,
    wherein:
        the processing circuitry calculates profits obtained by performing the transport of the product in the plurality of matching information, wherein each of the profits is calculated by subtracting, from a sale amount of the product to the second dealer, a cost of purchasing the product from the first dealer, a cost of transporting the product, and a travel cost of the first transport medium during the transport,
        the processing circuitry determines the plurality of matching information so as to maximize a sum of the profits, and
        the product in the determined plurality of matching information is transported by the first transport medium selected for the plurality of matching information.

2. The information processing apparatus according to claim 1, wherein
    the transport of the product includes a transport of the product from a location specified by the first dealer to a location specified by the second dealer.

3. The information processing apparatus according to claim 1, wherein
    the information of the first transport medium includes at least one of a load capacity of the product, a travel speed, a transport cost of the product, and a waste rate of the product.

4. The information processing apparatus according to claim 1, wherein
    the sell condition includes a sell location of the product, a sell availability period of the product, at least one of a quality and a quantity of the product, and a sell price of the product, and
    the buy condition includes a buy location of the product, a buy availability period of the product, at least one of the quality and the quantity of the product, and a buy price of the product.

5. The information processing apparatus according to claim 1, wherein
    a plurality of sell conditions are provided with respect to the first dealer, and
    the processing circuitry is configured to select only one of the plurality of sell conditions to combine the selected sell condition with the buy condition.

6. The information processing apparatus according to claim 5, wherein
    at least one of the plurality of sell conditions includes a sell price applied between the first dealer and a specific second dealer.

7. The information processing apparatus according to claim 1, wherein
    a plurality of buy conditions are provided with respect to the second dealer, and
    the processing circuitry is configured to select only one of the plurality of buy conditions to combine the selected buy condition with the sell condition.

8. The information processing apparatus according to claim 7, wherein
    at least one of the plurality of buy conditions includes a buy price applied between the second dealer and a specific first dealer.

9. The information processing apparatus according to claim 1, wherein
    the processing circuitry is configured to calculate a maximum number by which matching information pieces are generated on a basis of the information of the first transport medium, and generate the maximum number of the matching information pieces, and
    the processing circuitry is configured to assign transports equal to or less than the maximum number to the first transport medium on a basis of the maximum number of the matching information pieces.

10. The information processing apparatus according to claim 9, wherein
    the processing circuitry is configured to calculate the maximum number by which the matching information pieces are generated by solving a maximum flow problem, and generate the maximum number of the matching information pieces by solving a minimum-cost flow problem in which the maximum number is regarded as a maximum flow value.

11. The information processing apparatus according to claim 1, wherein
the processing circuitry is configured to assign and schedule the transport by solving a minimum-cost flow problem.

12. The information processing apparatus according to claim 1, wherein
the processing circuitry is configured to generate at least one matching information piece on a basis of a first list including a plurality of sell conditions and a second list including a plurality of buy conditions,
the processing circuitry is configured to remove, from the first list and the second list, the sell condition and the buy condition included in the matching information scheduled for transport by the first transport medium,
the processing circuitry is configured to generate matching information on a basis of the first list after the removal, the second list after the removal, and information of a second transport medium, and
the processing circuitry is configured to assign a transport based on the matching information to the second transport medium by associating the transport with the second transport medium and perform scheduling of the transport.

13. The information processing apparatus according to claim 12, further comprising:
the processing circuitry is configured to select a transport medium on a basis of priorities of a plurality of transport mediums, wherein
the second transport medium has lower priority than the first transport medium.

14. The information processing apparatus according to claim 13, wherein
the transport medium selector is configured to determine the priorities of the plurality of transport mediums on a basis of transport conditions of the plurality of transport mediums.

15. The information processing apparatus according to claim 1, further comprising:
a display configured to output data including a schedule of the transport generated for the determined plurality of matching information.

16. An information processing method for maximizing a profit of a trading entity engaged in a business of buying products from a first dealer and selling and transporting the bought products to a second dealer, comprising:
acquiring a plurality of sell conditions under which a plurality of first dealers sell products, a plurality of buy conditions under which a plurality of second dealers buy the products, and a transport medium list including information on a plurality of first transport mediums being able to be used to transport the products;
combining each of the sell conditions with one of the buy conditions which is matched with each of the sell conditions to generate a plurality of matching information each including the sell condition and the buy condition combined with the sell condition;
assigning a transport of the product in each of the plurality of matching information to one of the first transport mediums selected from the transport medium list;
performing scheduling of the transport of the product from the first dealer to the second dealer in each of the plurality of matching information;
calculating profits obtained by performing the transport of the product in the plurality of matching information, wherein each of the profits is calculated by subtracting, from a sale amount of the product to the second dealer, a cost of purchasing the product from the first dealer, a cost of transporting the product, and a travel cost of the first transport medium during the transport; and
determining the plurality of matching information so as to maximize a sum of the profits,
wherein the product in the determined plurality of matching information is transported by the first transport medium selected for the plurality of matching information.

17. A non-transitory computer readable medium having a computer program stored therein which when executed by a computer, causes the computer to perform processes comprising:
combining each of the sell conditions with one of the buy conditions which is matched with each of the sell conditions to generate a plurality of matching information each including the sell condition and the buy condition combined with the sell condition;
assigning a transport of the product in each of the plurality of matching information to one of the first transport mediums selected from the transport medium list;
performing scheduling of the transport of the product from the first dealer to the second dealer in each of the plurality of matching information;
calculating profits obtained by performing the transport of the product in the plurality of matching information, wherein each of the profits is calculated by subtracting, from a sale amount of the product to the second dealer, a cost of purchasing the product from the first dealer, a cost of transporting the product, and a travel cost of the first transport medium during the transport; and
determining the plurality of matching information so as to maximize a sum of the profits,
wherein the product in the determined plurality of matching information is transported by the first transport medium selected for the plurality of matching information.

18. An information processing apparatus comprising:
processing circuitry configured to
select a transport request including a resource used in a transport of a product on a basis of
information of a first transport medium to transport the product and
a constraint related to the resource; and
assign the transport of the product to the first transport medium by associating the transport with the first transport medium on a basis of the selected transport request and perform scheduling of the transport.

19. The information processing apparatus according to claim 18, wherein
the resource includes a first resource and a second resource, and
the first resource is a first dealer that sells the product, and the second resource is a second dealer that buys the product.

* * * * *